US005557709A

United States Patent [19]
Shu

[11] Patent Number: 5,557,709
[45] Date of Patent: Sep. 17, 1996

[54] METHOD AND APPARATUS FOR DITHER ARRAY GENERATION TO REDUCE ARTIFACTS IN HALFTONED IMAGES

[75] Inventor: Joseph S. Shu, San Jose, Calif.

[73] Assignee: Seiko Epson Corporation, Tokyo, Japan

[21] Appl. No.: 269,709

[22] Filed: Jul. 1, 1994

[51] Int. Cl.$^6$ ................................................. G06K 1/00
[52] U.S. Cl. ........................................ 395/109; 358/456
[58] Field of Search ................................ 395/101, 109, 395/128, 129, 147; 358/455, 456, 457; 345/89; 382/56

[56] References Cited

U.S. PATENT DOCUMENTS

| | | | |
|---|---|---|---|
| 4,196,454 | 4/1980 | Warren | 358/456 |
| 4,339,774 | 7/1982 | Temple . | |
| 4,345,313 | 8/1982 | Knox | 382/254 |
| 4,449,150 | 5/1984 | Kato | 358/456 |
| 4,668,995 | 5/1987 | Chen et al. | 382/272 |
| 4,680,645 | 7/1987 | Dispoto et al. | 358/298 |
| 4,752,822 | 6/1988 | Kawamura | 358/523 |
| 4,955,065 | 9/1990 | Ulichney | 382/50 |
| 5,031,050 | 7/1991 | Chan | 358/298 |
| 5,077,615 | 12/1991 | Tsuji | 358/298 |
| 5,111,302 | 5/1992 | Chan et al. | 358/298 |
| 5,134,667 | 7/1992 | Suzuki | 382/22 |
| 5,201,013 | 4/1993 | Kumagai | 382/270 |
| 5,276,535 | 1/1994 | Levien | 358/456 |
| 5,278,671 | 1/1994 | Takahashi et al. | 358/456 |
| 5,313,287 | 5/1994 | Bauton | 358/458 |
| 5,315,669 | 5/1994 | Kumagai | 382/270 |
| 5,341,228 | 8/1994 | Parker et al. | 358/534 |
| 5,363,210 | 11/1994 | Sasaki et al. | 358/448 |

OTHER PUBLICATIONS

*The Void–and–Cluster Method For Dither Array Generation*, R. Ulichney, (IS&T/SPIE Symposium on Electronic Imaging Science & Tech., San Jose, CA, Feb. 3, 1993).
*Model–Based Halftoning*, Thrasyvoulos N. Pappas, David L. Neuhoff, SPIE/IS&T Symposium on Electronic Imaging Science & Tech., San Jose, CA, USA 2.4 Feb. 1, Mar. 1991.

*Session 36 Issues In Display Modeling*, H. Masterman, S. Atwood SID International Symposium Digest of Tech. Papers vol. XXV, San Jose McEnery Convention Center San Jose, CA. Jun. 14–16, 1994, pp. 777–812.
*Image Processing Algorithms and Techniques II*, vol. 1452 M. Civanlar S. Mitra, R. Moorhead II, SPIE The International Society for Optical Engineering, 1991, pp. 47–56.
*Dispersed–Dot Ordered Dither,* Digital Halftoning, R. Ulichney pp. 127–177, 1987.
Kurosawa, Toshiharu A High Speed Halftoning Processor . . . , IEEE Journal, Feb. 1992, vol. 27, Issue 2.
Sore Hein, Halftone to Continuous Tone Conversion of Error Diffusion Coded Images, IEEE Acousties, Jan. 1993.
Jorg Wild, Design of Multilevel Threshold Matrices . . ., IEEE Proceedings, Jan. 1989.

*Primary Examiner*—Raymond J. Bayerl
*Assistant Examiner*—Gabriel I. Garcia
*Attorney, Agent, or Firm*—Eric B. Janofsky

[57] ABSTRACT

An existing void-and-cluster method for generating dither arrays for halftoning grayscale images on binary printing devices is improved by including additional steps which both homogenize the starting pattern used in the void-and-cluster method and correct the starting pattern for the effects of oversized dots generated by the printing devices. More particularly, a constant gray starting pattern is first subjected to an error diffusion halftoning process before void and cluster processing to produce a starting binary pattern as a more homogeneous starting point. In addition, after the starting binary pattern has been created, it can be modified to take into account that most printers print "oversized dots" in order to avoid white areas between dots. In particular, from the starting binary pattern, a starting gray pattern is created which uses oversized dot information to assign grayscale values to the "0" pixels surrounding a "1" pixel. Then cluster-finding and void-finding filters are used on both the starting binary pattern and the starting gray pattern to locate "clusters" and "voids". Pixels are transferred from the clusters to the voids to homogenize the arrays and generate an initial binary pattern and an initial gray pattern. The initial binary pattern and the initial gray pattern are then used to assign threshold values to the dither array.

20 Claims, 10 Drawing Sheets

METHOD AND APPARATUS FOR DITHER ARRAY GENERATION TO REDUCE ARTIFACTS IN HALFTONED IMAGES

BACKGROUND OF THE INVENTION

1. Field of the Invention

The present invention relates to digital printing devices, and, in particular, to methods and apparatus for generating dither arrays for use in halftoning operations that convert a grayscale input to a binary output suitable for printing.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any case, the dot itself has a uniform color so that the resulting output consists of an array of colored and blank pixels.

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called preprocessing. Numerous halftoning techniques have been developed and refined over the years. In their simplest form, such techniques compare the value of each digital word with a threshold level, and generate a binary output pixel value depending on the relative values.

For example, a digital scanner processing a continuous-tone image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with a either a single threshold value or an array of threshold values to produce the required binary output pixel stream. In such a system, each 8-bit scanner word has effectively been compressed into a single-bit output word.

Naturally, such compression produces a significant loss of visual information and, in turn, creates distortions in the reproduced image that are not present in the original image. Additional techniques have therefore been developed to reduce the visual distortions created by the halftoning process. One approach, known as "error diffusion", attempts to "diffuse" the "quantization error" (i.e., the difference between the input value represented by a multi-bit word and the output value represented by a single bit or two multi-bit words) proportionally among neighboring pixels. During one embodiment of the error diffusion process, the input pixels represented by the input words are processed in "raster" order (line-by-line with each line being processed from left to right before the next lower line is processed). Each pixel is processed by comparing its value to a predetermined threshold value and the resulting quantization error, multiplied by a proportional coefficient, is added to the neighboring, but unprocessed, pixel values (in one illustrative embodiment, the pixel to the right of the one being processed and the three neighboring pixels in the following pixel line). The proportional coefficients are selected to add to 100%. The next pixel, comprising its original value plus the portion of the quantization error produced by the processing of the previous pixel, is then processed in the same manner. In this manner, the quantization error is spread or diffused over several pixels.

In general, error diffusion produces an excellent image reproduction, but also creates well-known artifacts called "worms" and "snowplowing" which degrade image quality. Various attempts have been made to vary the processing order (from the raster scan order of the illustrative embodiment) in order to reduce the artifact patterns. These attempts have been only partially successful as the artifact patterns were not totally removed but were changed in appearance or orientation in a manner that was more pleasing to the eye.

In addition, another problem inherent in the error diffusion method is the large number of computations which must be made to process an image. Since several computations, including multiplications, must be performed for each pixel which is processed, a typical high-resolution image may require many millions of computations to generate the final output values. In addition, it is necessary to store at least one line of error values which are to be applied to the following line of image values. This large number of computations and the required storage combine to increase the processing time for each image which processing time increase directly results in decreased printing device throughput.

Accordingly, additional halftoning techniques have been developed to reduce the computations involved to process an image. One such conventional halftone technique is called "ordered dithering". In accordance with conventional ordered dithering techniques, an array of predetermined, generally different, threshold values (called a dither array) with the same spacing as the image pixels is conceptually overlaid onto the image pixel array. If the dither array is smaller than the image array, then the dither array is repeated side-by-side or "tiled" over the image array to produce a repetitive pattern. Each pixel thus conceptually has two values associated with it, the actual pixel tonal value and the threshold value of the overlaid dither array. Equivalently, the values in the dither array can be added to the image value of each pixel prior to a comparison with a fixed threshold.

Each pixel is then processed by comparing its tonal value to the associated dither array value (or the augmented pixel value is compared to a fixed threshold) and the output pixel value is generated based on the comparison. Since the processing of each pixel involves only a simple comparison and is independent of neighboring pixel values, the computation time required to process an entire image is greatly reduced from the error diffusion processing time.

However, the quality of the resulting processed image is entirely dependent on the threshold values chosen for the dither array. In general, there are two types of dither arrays in common use. The first is called a "cluster-dot" dithering array and, in such an array, the threshold values are arranged in small clusters of similar-valued threshold numbers. The clusters of values in such arrays mimic "dots" of various sizes and thus produce a processed image with the same characteristics as produced by the traditional halftone screens used for years in photoengraving processes.

The second type of dither array is called a "dispersed-dot" dither array in which the different threshold values are spread evenly over the entire array. For image reproduction devices which can display clearly a single isolated pixel, the dispersed dot dither array usually produces better processed image quality than the cluster-dot dither array because high frequency fidelity is better and dispersed-dot arrays create a better illusion of a constant gray region than do cluster-dot arrays of the same resolution and period.

With both types of arrays, a tradeoff generally exists between the number of discrete gray levels that can be represented (which increases as the number of dither array elements increases) and the appearance of annoying low-frequency geometrical patterns in areas of uniform gray (which also appear as the number of dither array elements increases). Increasing the size of the dither array also tends to decrease image resolution as low frequency values disappear. One way to reduce these patterns and to retain resolution is to make the size of the dither array very large and utilize homogenous patterns of threshold values where successive threshold values "turn on" pixels in a homogenous random pattern. However, as the array size increases, assigning threshold values to the array cells to produce such a homogenous pattern becomes a non-trivial matter. Accordingly, various prior art schemes have been developed to derive the random threshold sequences and assign them to the array cells.

One common technique used to create a homogenous ordered dither array is called "recursive tesselation". The goal of recursive tessellation is to assign threshold values to each of the dither array cells in such a way that, as each successive cell is numbered or "turned on", the two-dimensional array of "on" cells is as homogeneously arranged as possible. Thus, when the dither array is used as a threshold array in a halftoning process, the corresponding arrangement of output binary dots will be disbursed as homogeneously as possible for each gray level to be simulated.

The algorithm used in recursive tessellation for generating the threshold array is based on the fact that if a regular geometric shape or "tile" is used cover or tesselate the two-dimensional dither array, the center point of the shape and its vertices can serve as center points for a retesselation of the array with new tiles of the same geometric shape but sized one cell smaller. In turn, the center points and vertices of these new tiles can act as center points for another retesselation with tiles that are again one cell smaller.

In accordance with the recursive tessellation algorithm, all of the tile vertices at each stage of this recursive tessellation are assigned threshold numbers before the next tessellation takes place. The algorithm provides a mechanism for locating a family of points that are exactly in the center of voids which occur between the vertex points of the tiles. Essentially, new points are added in the largest "voids" or areas where there is an absence of "on" pixels. The recursive tesselation method and the resulting threshold arrays are described in detail in "Digital Halftoning" by Robert Ulichney, printed by the MIT Press, Cambridge, Massachusetts and London, England, 1990, pages 128–171. While the recursive tessellation method can produce large dither arrays, these arrays suffer from a strong periodic structure that imparts an unnatural appearance to the resulting images when the arrays are used in a conventional halftoning operation.

Consequently, other prior art methods have been developed to generate dither arrays and one of these prior art methods is called a "blue noise mask". In general, "blue noise" is the high-frequency portion of a white noise spectrum. The power spectrum of blue noise has a low-frequency cutoff and is flat out to some fine high frequency limit. In general, the dot patterns produced by a blue noise mask are aperiodic and radially symmetric and these patterns produce an aperiodic, uncorrelated dither array structure without low frequency graininess. The choice of a blue noise mask arose from studies of the frequencies present in dot patterns produced by the error diffusion process described previously. When these dot patterns are converted into to a power spectrum of power versus frequency, it can be seen that the power spectrum has a low frequency cutoff point which occurs in the blue light frequency range, hence the name "blue noise".

The shape of the power spectrum can be used to construct dither arrays by examining dot patterns which produce blue noise power spectra and creating dither arrays from these dot patterns. The resulting arrays produce a high-quality output, however, the conversions between the frequency and spatial domains necessary to derive the arrays produces a complicated algorithm for generating the dither arrays. Blue noise masks are described in more detail in "Digital Halftoning Using A Blue Noise Mask", T. Mitsa and K. Parker, *Proceedings SPIE, Image Processing Algorithms And Techniques II*, v.1452, pps. 47–56, Feb. 21st–Mar. 1, 1991.

Another prior art technique for generating a large, homogeneous dither array is called the "void-and-cluster method". Again, the goal of this latter method is to produce a homogeneous distribution of 1's and 0's by starting with an initial pattern and removing pixels from the center of the tightest "clusters" and inserting them into the largest "voids". The void-and-cluster method is described in detail in "The Void-and-Cluster Method For Dither Array Generation", Robert Ulichney, *IS&T/SPIE Symposium on Electronic Imaging Science and Technology*, San Jose, Calif., Feb. 3, 1993 and "Filter Design For Void-and-Cluster Dither Arrays", Robert Ulichney, *Society for Information Display International Symposium*, San Jose, Calif., Jun. 14–16, 1994, the contents of which are hereby incorporated by reference.

In particular, in accordance with the aforementioned articles, the initial pattern used to generate the dither arrays is called a "Prototype Binary Pattern" and the terms "cluster" and "void" are defined in terms of "minority pixels" and "majority pixels". When less than half of the pixels in the Prototype Binary Pattern are of a particular type (either "1's" or "0's") they are denoted as minority pixels and the other type of pixel is denoted as a majority pixel. Using these definitions of minority and majority pixel, the terms "cluster" and "void" refer to the arrangement of minority pixels on a background of majority pixels. In particular, a "void" is a large space between minority pixels and a "cluster" is a tight grouping of minority pixels. During the processing of the Prototype Binary Pattern, minority pixels are always added to the center of the largest voids and are removed (or replaced with a majority pixel) from the center of the tightest cluster in order to homogenize the pattern.

The void-and-cluster method consists of three distinct steps:

(A) generating the Prototype Binary Pattern;

(B) "homogenizing" the Prototype Binary Pattern by removing pixels from the clusters and assigning them to the voids to generate a homogenized Initial Binary Pattern; and (C) assigning dither array threshold numbers to the resulting homogenized Initial Binary Pattern.

More specifically, the Prototype Binary Pattern is generated by using any convenient technique that generates an input pattern where not more than half the pixels are "1's" and the rest are "0's". For example, a white noise pattern will serve as the Prototype Binary Pattern.

The next step in the method is to find the "voids" and the "clusters" so that pixels can be moved between the voids and clusters. Voids and clusters are located by means of a filter which examines the neighboring pixels bordering each pixel being processed. In particular, a void-finding filter considers the neighborhood pixels around every majority pixel in the Prototype Binary Pattern and a cluster-finding filter considers the neighborhood pixels around every minority pixel. In the aforementioned articles, a two-dimensional Gaussian filter represented by the function:

$$e^{-\frac{x^2}{2\sigma_x^2} - \frac{y^2}{2\sigma_y^2}}$$

is used in order to find voids and clusters. During this processing, the values in the array are repeatedly processed and a single pixel may be moved several times from cluster to void. This processing is performed iteratively until the voids stop getting smaller and the clusters stop getting looser. Processing is deemed complete when removing the "1" from the tightest cluster in the pattern creates the largest void. The resulting homogenized pattern is called the Initial Binary Pattern.

In accordance with the third step of the method, the dither array is built from the Initial Binary Pattern by assigning threshold values to the dither array using the Initial Binary Pattern. In performing this step, the Initial Binary Pattern and the dither array are manipulated in parallel in three phases in accordance with a predetermined algorithm. Threshold values are assigned to the dither array cells based on the "rank" value of the "1's" in the Initial Binary Pattern. In particular in Phase I, one minority pixel or "1" is removed at a time from the Initial Binary Pattern while, in parallel, the rank or the number of minority pixels remaining in the Initial Binary Pattern is entered into the dither array in the location corresponding to the location of the removed "1". In each case, the minority pixel that is removed is the pixel in the center of the tightest cluster.

In the second phase (Phase II) the Initial Binary Pattern is again used as the starting basis and one minority pixel (or "1") is inserted at a time into the Initial Binary Pattern while, in parallel, its rank is entered into the dither array. In each case, the minority pixel that is inserted is done so at the location of a "0" identified as the center of the largest void.

Finally, in Phase III the Initial Binary Pattern produced by adding "1's" in Phase II is used as the starting point. In Phase III, the meaning of "minority pixel" is reversed from "1" to "0" because there are more 1's than 0's in the Initial Binary Pattern due to "1's" being added in Phase II. The Initial Binary Pattern is now filled with more and more 1's while the dither array continues to be filled with the rank values. In each step a "1" is inserted in the "0" location identified in the tightest cluster of minority pixels. At the end of Phase III, the Initial Binary Pattern is filled with all 1's and the dither array is filled with a unique rank value in each element from 0 to the maximum of pixels.

While the void and cluster method produces a dither array that, in turn, generates high-quality halftoned images that are generally artifact-free there is still some tonal distortion and the resulting image can be further improved.

Accordingly, it is an object of the present invention to reduce the tonal distortion produced by halftoning using a dither array generated by the void-and-cluster method.

It is a further object of the present invention to generate an ordered dispersed-dot dither array of arbitrary size wherein the dots are distributed homogeneously.

DESCRIPTION OF THE INVENTION

Summary of the Invention

The foregoing problems are solved and the foregoing objects are achieved in one illustrative embodiment of the invention in which the prior art void-and-cluster method is modified by including two additional steps which generate a more homogenized Prototype Binary Pattern and adjust the Prototype Binary Pattern for the effects of oversized dots generated by the printing devices. More particularly, the Prototype Binary Pattern is generated by subjecting a grayscale starting pattern to an error diffusion process to generate a first binary pattern. This first binary pattern can be used to produce the Initial Binary Pattern and it has been found that this initial processing produces a more homogeneous starting point and results in a more homogeneous Initial Binary Pattern.

For example, if the starting pattern is a grayscale white-noise pattern, an error diffusion process can be applied to it before processing the pattern by moving pixels from clusters to voids to generate the Initial Binary Pattern.

In addition, after the first binary pattern has been created, it is preferably modified to take into account that most printers print "oversized dots" in order to avoid white areas between dots. In particular, from the first binary pattern created using the error diffusion process, a second binary pattern is created which uses oversized dot information to assign grayscale values to the "0" pixels surrounding a "1" pixel. Then the cluster-finding and void-finding filters are used on this second binary pattern to generate the Initial Binary Pattern and the remainder of the prior void-and-cluster method is used to determine the dither array.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
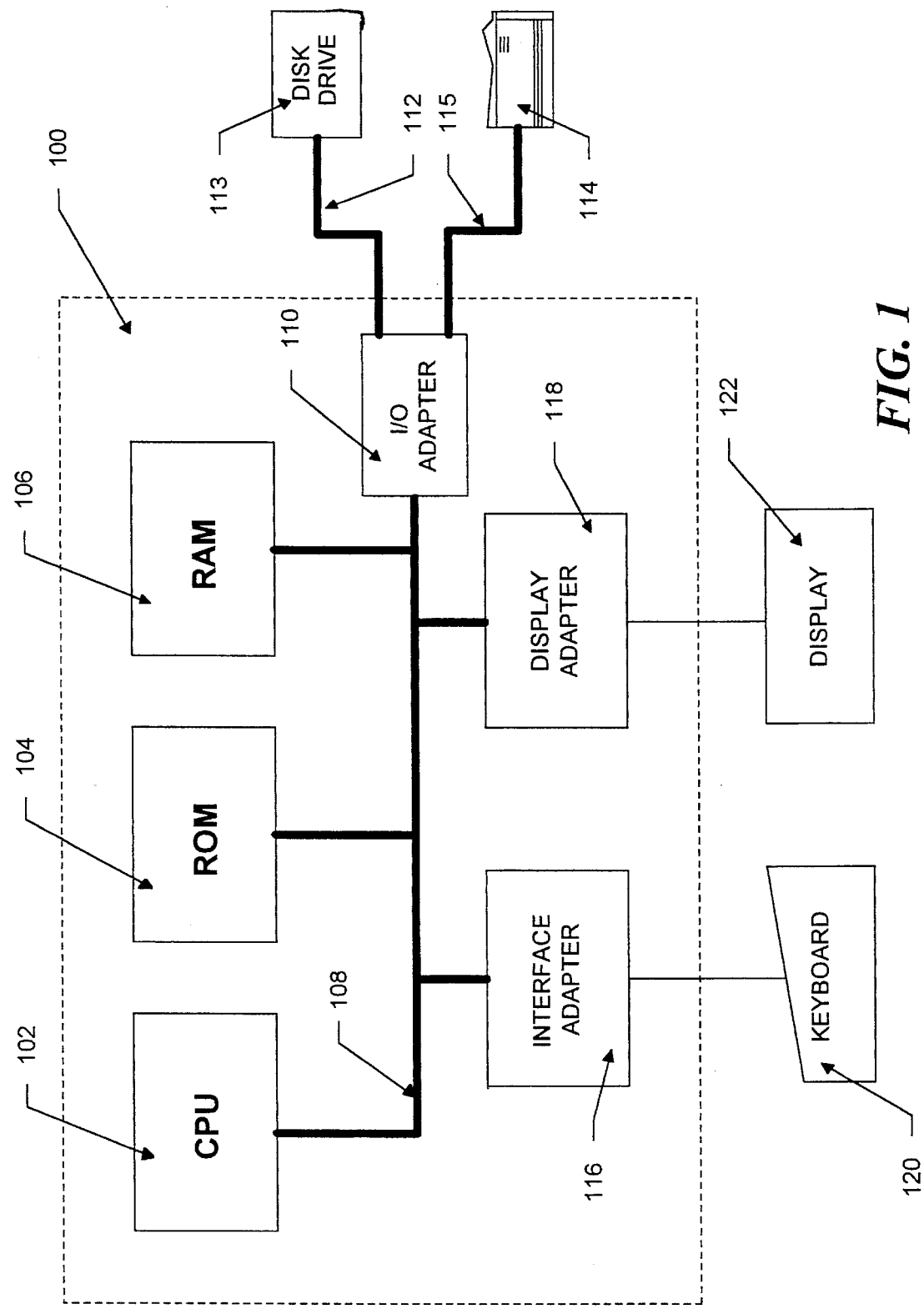
FIG. 1 is a block schematic diagram of a computer system, for example, a personal computer system on which a halftoning operation using a dither array created with the inventive method can operate.

The invention is preferably practiced in the context of an operating system which is resident on a personal computer such as the IBM®, PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon and is controlled and coordinated by operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

Figure 2:
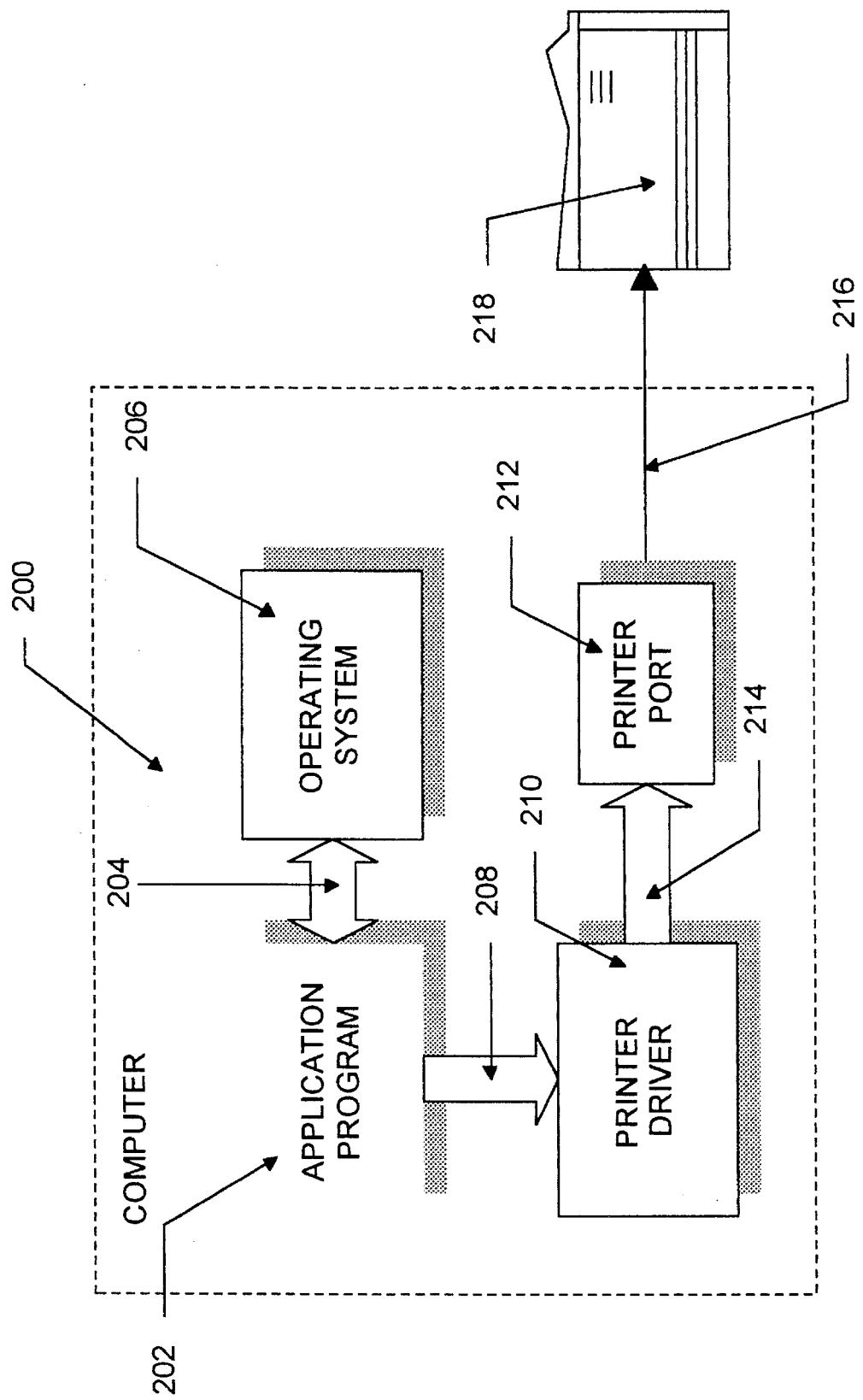
FIG. 2 is a schematic block diagram of a prior art computer system showing the relationship of an application program, an operating system and a printer driver in which the halftoning operation is performed.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains a "imaging engine" which is a hardware device or a ROM-programmed computer which takes the incoming information stream and converts it into the electrical signals necessary to drive the actual printing elements. The result is a "hard copy" output on the selected medium.

Figure 3A:
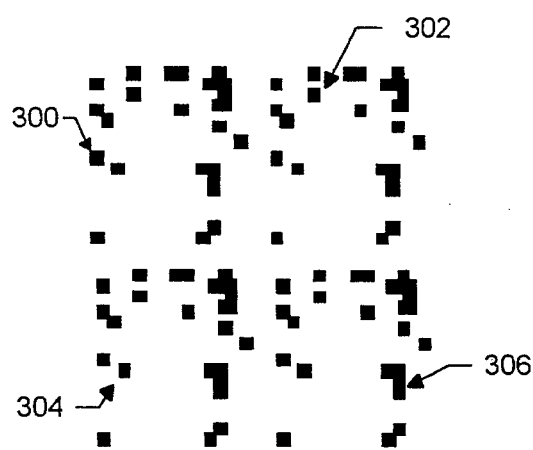
FIG. 3A is an illustrative Prototype Binary Pattern generated using white noise.

Dither array generation may take place in the computer system shown in FIG. 1 and generally is done "off-line" before halftone operations begin. In this manner, the printer driver software 210 only has to perform the comparison of the image data with the dither array threshold values during processing of the image. FIG. 3A shows a typical starting pattern (called a "Prototype Binary Pattern") which can be used in accordance with the prior art void-and-cluster dither array generation method. A pattern such as that shown in FIG. 3A might, for example, be generated by taking the output of a white-noise generator and quantizing it to a pattern of binary "1's" and "0's" by comparing the white noise values to a fixed threshold and inserting a "1" where the noise value exceeds the threshold and inserting a "0" where the noise value is less then the threshold. The pattern shown in FIG. 3A actually consists of four identical tile patterns, 300, 302, 304 and 306. The Prototype Binary Pattern used as the starting point of the prior art dither array generation method would actually consist of one of these patterns, however, four are shown to illustrate how the patterns can be used to tile a two-dimensional image.

When the Prototype Binary Pattern shown in FIG. 3A is used with the prior art void-and-cluster method, the pattern is directly homogenized by removing pixels from the tightest clusters and placing them in the largest voids. However, it has been found that the quality of the output image produced using the generated dither array depends critically on the starting pattern that is used to begin the process. A pattern, such as pattern 300 shown in FIG. 3A, is not homogeneous to start with due to the coarse quantizing.

Figure 1A:
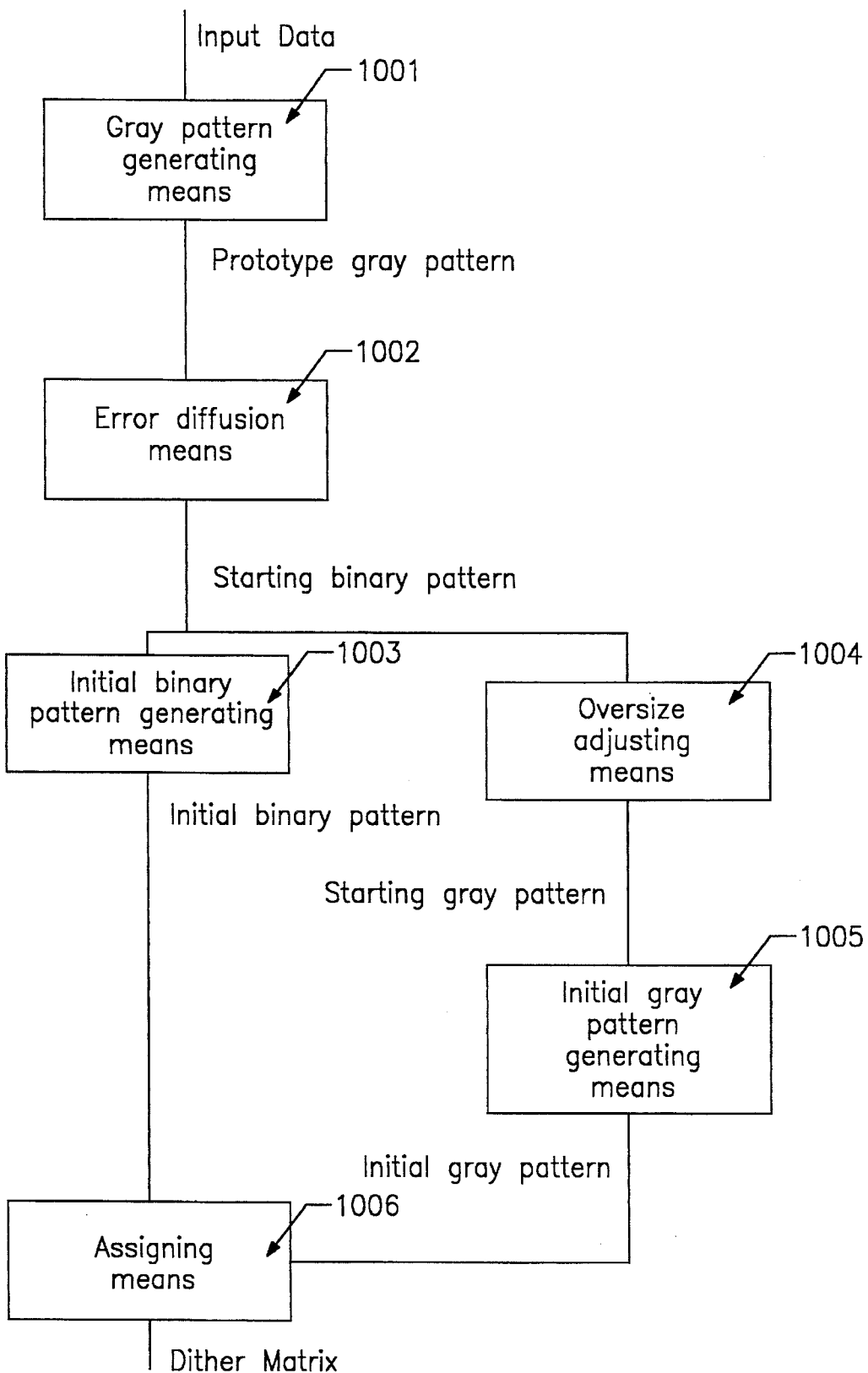
FIG. 1A is a block diagram of an embodiment of the present invention.

Consequently, in accordance with the principles of the invention a more homogeneous pattern is generated before further homogenization is performed by removing pixels from the tightest clusters and placing them in the largest voids. The generation of this more homogeneous starting pattern begins with an array which is filled with identical grayscale values by a gray pattern generating means 1001 (FIG. 1A). Each of the values represents a constant gray tone with a value less than one half of the total scale. For example, in an eight-bit per pixel system (with a maximum value of 255 for each pixel), each element of the array would be initially filled with the same number, which number has a value of less than 127.

Figure 3B:
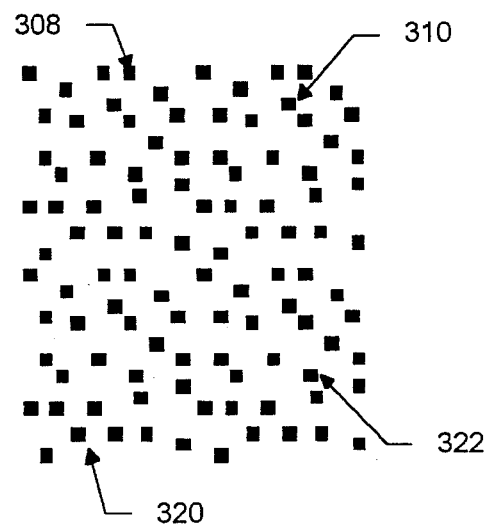
FIG. 3B is an improved Prototype Binary Pattern generated by applying a conventional error diffusion technique to the pattern in FIG. 3A.

If error diffusion is then applied by error diffusion means 1002 to this constant gray input (called a "Prototype Gray Pattern"), a more homogeneous first binary pattern 308 as shown in FIG. 3B is produced. The increased homogeneity results in an even more homogeneous Initial Binary Pattern after void and cluster processing has been completed, which, in turn, results in a better output result. Note that in FIG. 3B the error-diffused pattern still consists of four separate patterns 308, 310, 320 and 322.

Figure 4A:
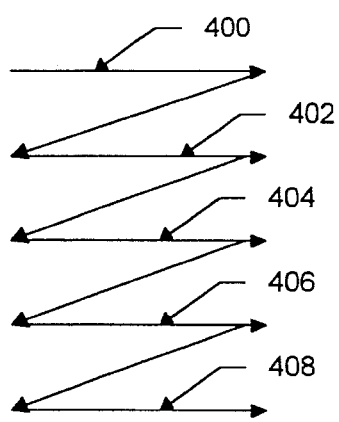
FIG. 4A illustrates a processing sequence for processing pixels in the Prototype Binary Pattern using the error diffusion technique.

The error diffusion process used to process the Prototype Gray Pattern is well-known and is, for example, described in detail in the aforementioned book entitled "Digital Halftoning" at pps. 239–319. During the error diffusion process, the pixels which comprise the Prototype Gray Pattern are processed on a line-by-line fashion and, in each line, the pixels are processed in single direction (from left-to-right or right-to-left). Between lines the processing direction may vary. A number of different embodiments of the error diffusion technique exist which use different line processing patterns. However, a line processing pattern suitable for use with the present invention is shown in FIG. 4A. In particular each of the pixel lines 400, 402, 404, 406 and 408 is processed from left-to-right then the next line is processed from left-to-right and the following line is processed from left to right, etc. until the entire image is processed in the top to bottom direction.

Figure 4B:
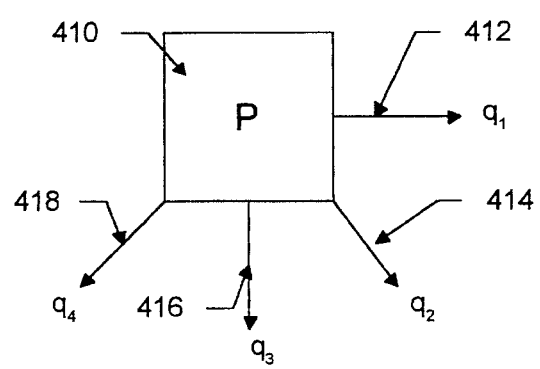
FIG. 4B illustrates an illustrative selection of proportional coefficients used in the error diffusion processing.

FIG. 4B illustrates diffusion of the error generated during the processing of each pixel to neighboring pixels. In particular, each pixel is processed by comparing its value to a predetermined threshold value where the pixel "value" is the original grayscale value plus error adjustments resulting from the previous processing of other pixels. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

This "diffusion" process is illustrated in FIG. 4B where the pixel being processed is depicted as box 410. In the illustrated arrangement, the error resulting from the processing is spread to the neighboring pixel to the immediate right of the processed pixel 410 (as indicated by arrow 412) and to three neighboring pixels on the next line of binary pattern pixels as indicated by arrows 414, 416 and 418. Before being added to the neighboring pixels, the error value is multiplied by a proportionality constant. The values of these constants, $q_1$ $q_2$ $q_3$ and $q_4$ are arranged such that $q_1+q_2+q_3+q_4=1$. In the illustrative embodiment, the following weights are used: $q_1=5/16$, $q_2=1/16$, $q_3=7/16$ and $q_4=3/16$. After pixel 410 has been processed, the neighboring pixel to the right of pixel 410 is processed by adding the proportionalized error value to the pixel value and processing it in the same manner as pixel 410. After each pixel in a line has been processed in this manner, the next line in the Prototype Gray Pattern is processed in the same manner.

The binary pattern (hereinafter called the "Starting Binary Pattern") resulting from the application of the error diffusion process to the Prototype Gray Pattern can be used directly as the starting pattern for the prior art void-and-cluster processing homogenization step. However, it has been found that improved dither arrays are produced if additional corrections are made to the Starting Binary Pattern before void-and-cluster processing is performed. In accordance with the principles of the invention, another correction is made to the Starting Binary Pattern to account for "oversized" dots produced by printing devices such as inkjet or laser printers by oversize adjusting means 1004.

Figure 5:
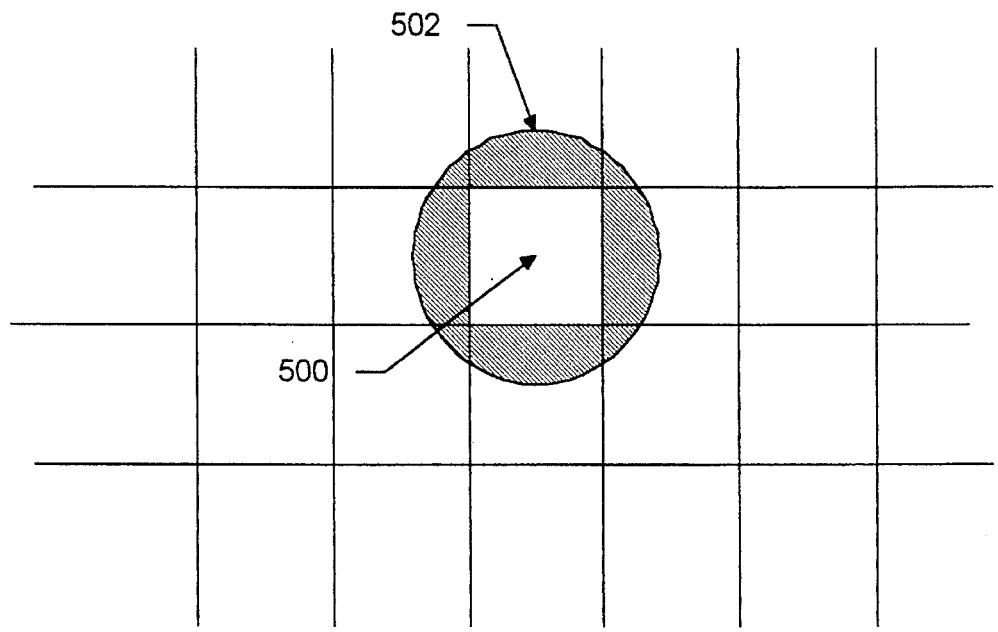
FIG. 5 shows the square pixel assumed in the prior art void-and-cluster method overlaid by an actual printed dot, illustrating the amount of overlap.

In particular, the prior art void-and-cluster dither array generation method assumes that the output pixels are square so that neighboring pixels abut each other with no overlap. This pixel shape is shown in FIG. 5 where the pixel assumed by the prior art void and cluster method is shown as square pixel 500. However, many printing devices actually generate a circular dot such as dot 502. This diameter of this dot is generally larger than the square pixel area so that dots corresponding to adjacent pixels will overlap to eliminate all white spots in an "all-black" area. Accordingly, dot 502 is larger than pixel 500 so that the shaded overlap area is not taken into account in the prior art void-and-cluster method. In accordance with the invention, in order to take this shaded area into account, three distinct overlap areas must be considered which are formed when the oversized or shaded area in FIG. 5 overlaps other pixels. The shape and location of these three distinct areas is shown in FIG. 6.

Figure 6:
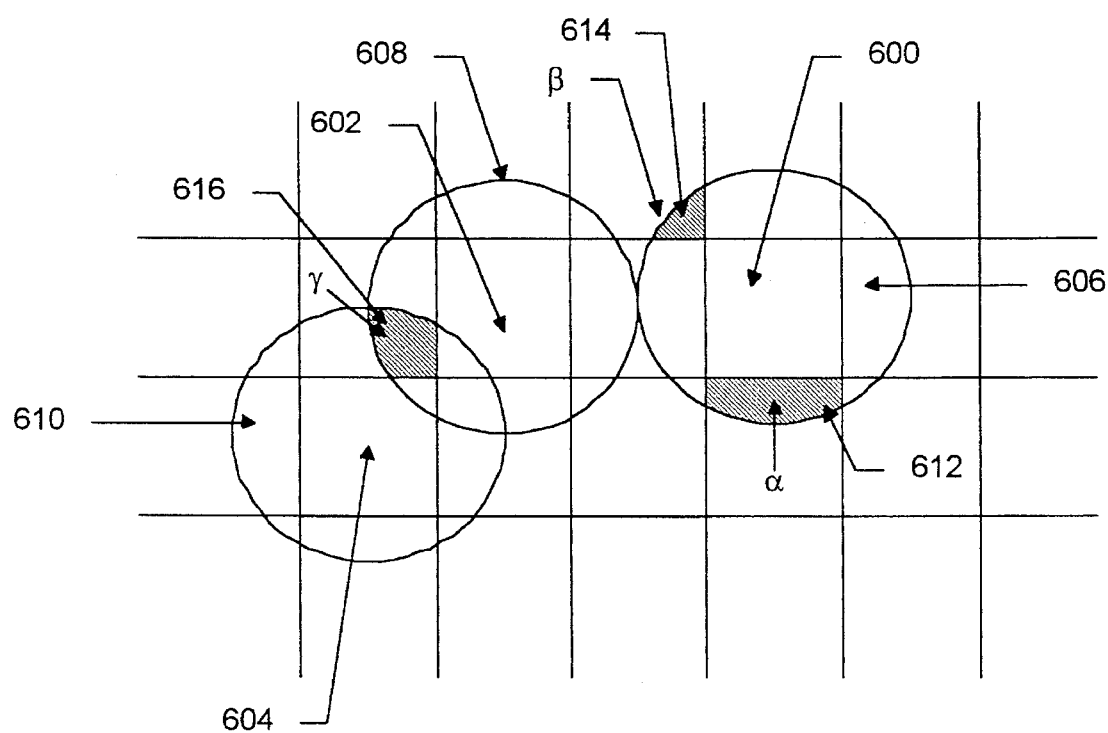
FIG. 6 illustrates the three adjustment areas ($\alpha$, $\beta$ and $\gamma$) used to correct the Initial Binary Pattern to account for oversized dots.

More particularly, FIG. 6 shows three "on" pixels, 600, 602 and 604, and the accompanying printer dots 606, 608 and 610 which would be used to represent the three pixel areas 600, 602 and 604. The overlap caused by the oversized printer dots results in three distinct area types can be used either singularly, or in combination, to correctly adjust adjacent areas for dot overlaps. These areas are illustrated as the shaded areas shown in FIG. 6. For example, first area type, 612, is designated as an "α" area. The next area type is area 614 designated as a "β" area, and the third area type (caused by an overlap of two dots) is area 616 called a "γ" area. The sizes of the α, β and γ areas are fixed for each particular type of printer and depend on the printer dot radius and the printer resolution. The dot radius for any particular printer can be determined by examining the dots produced by the printer under a microscope. Once the dot radius has been ascertained, a normalized radius ($r_o$) can be computed using the formula:

$$r_o = \frac{\text{measured dot radius}}{\left(\frac{1}{dpi}\right)\left(\frac{1}{\sqrt{2}}\right)}$$

where "dpi" is the "dots per inch" resolution of the printer. Once $r_o$ has been calculated, the three areas, $\alpha$, $\beta$ and $\gamma$, can be determined according to the following formulas:

$$\alpha = 0.5 * r_o^2 * \sin^{-1}\left(\frac{1}{r_o\sqrt{2}}\right) + 0.25 *$$
$$\left(1 - \tan\left(\sin^{-1}\left(\frac{1}{r_o\sqrt{2}}\right)\right)\right) * \sqrt{2r_o^2 - 1} - 0.25$$

$$\beta = 0.125 * \pi * r_o^2 - 0.25 - \alpha$$

$$\gamma = 0.5 * r_o^2 * \cos^{-1}\left(\frac{1}{r_o}\right) - 0.5 * \sqrt{r_o^2 - 1} - \beta$$

Figure 7A:
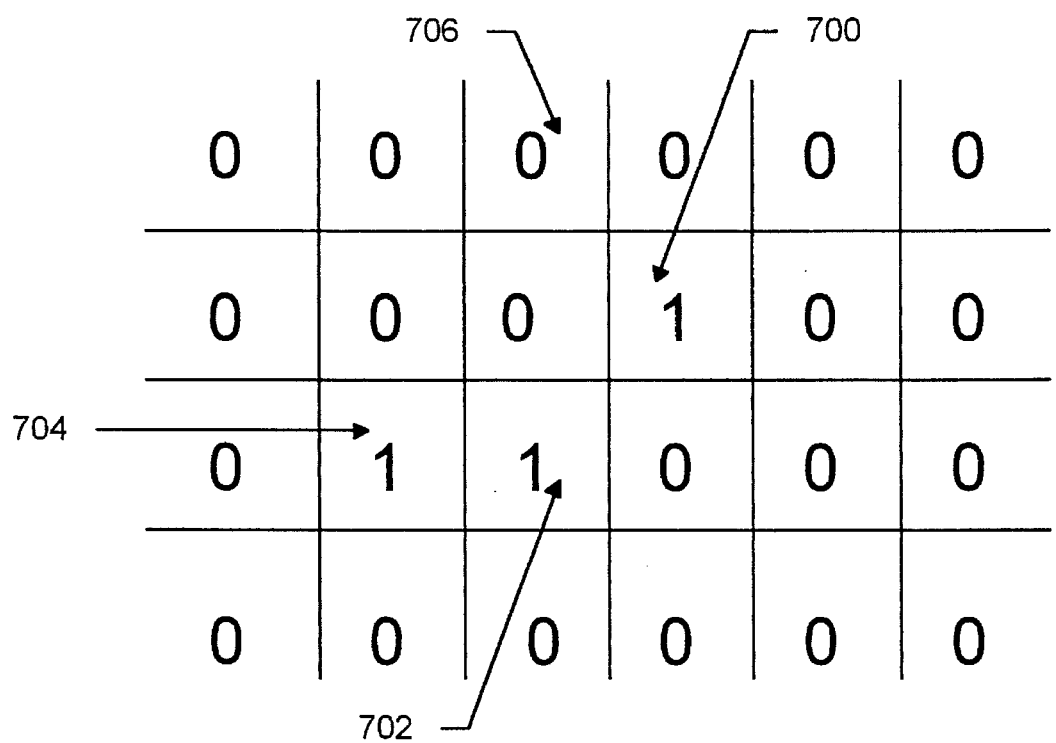
FIG. 7A is a portion of the Initial Binary Pattern created with the prior art void-and-cluster method illustrating the values assigned to each array cell.
Figure 7B:
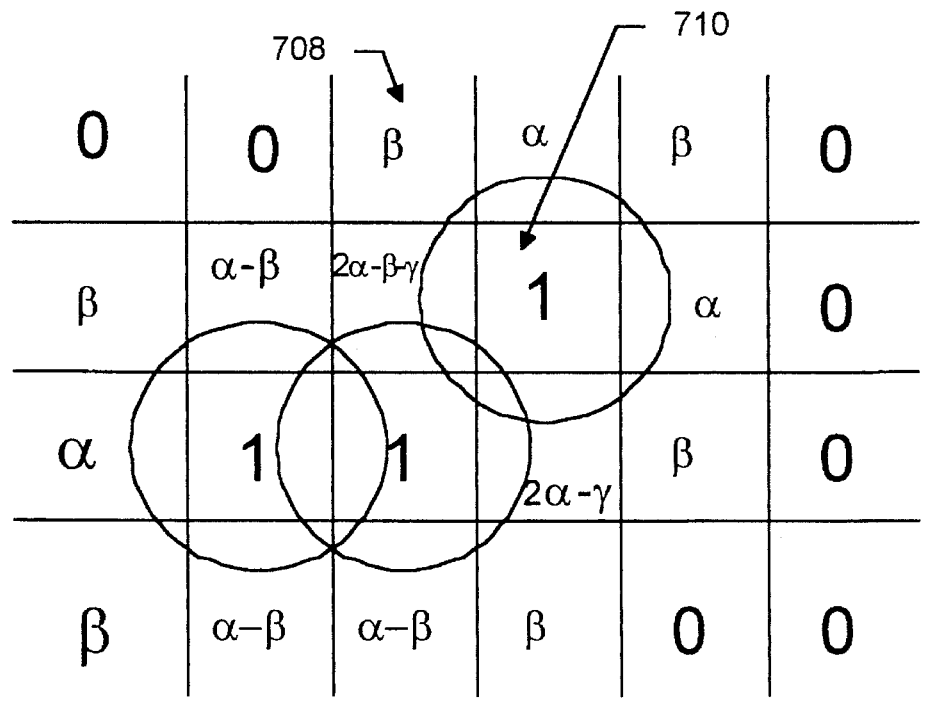
FIG. 7B is the same portion of the Initial Binary Pattern created with the inventive improved void-and-cluster method illustrating the adjusted values assigned to each array cell.

FIG. 7A and 7B illustrate how corrections are made to the either the Prototype Binary Pattern (the white noise pattern used in the prior art void-and-cluster method) or the Starting Binary Pattern (the Prototype Gray Pattern after error diffusion has been applied) to account for oversized dots. FIG. 7A shows a section of the pattern, for example which might be a section of the pattern shown in either of FIGS. 3A or 3B which is generated assuming square pixels. The pattern comprises a rectangular array of "1's" and "0's" and the particular section of the array shown in FIG. 7A consists of mostly "0's" with three "1's" located in array elements 700, 702 and 704.

FIG. 7B shows the same array portion which has been corrected for effects of the oversized dots. For example array element 708 in FIG. 7B now has been adjusted by adding the value of "$\beta$" to the original value ("0"). The adjustment arises from the overlap area produced by the dot located in element 710. Accordingly, this value is changed from the original "0" value in the corresponding element 706 in FIG. 7A. Similarly, the values in the array elements surrounding the three "1's" are adjusted in accordance with the overlap areas produced by the oversized dots as illustrated in FIG. 7B. These adjustments impart "grayscale" values to the surrounding elements and tend to further refine the dot patterns. Due to the added grayscale values this pattern is hereinafter called a "Starting Gray Pattern".

In accordance with the principles of the invention, both the Starting Binary Pattern (as shown in FIG. 3B) and the Starting Gray Pattern (as shown in FIG. 7B) are then subjected to void-and-cluster processing to create an Initial Binary Pattern by initial binary pattern generating means 1003 and an Initial Gray Pattern by initial gray pattern generating means 1005, respectively, by moving pixels from clusters to voids. It has been found that the additional adjustments as illustrated in FIGS. 3B and 7B further enhance the quality of the dither array generated by the inventive void-and-cluster method by assigning means 1006.

Figure 8:
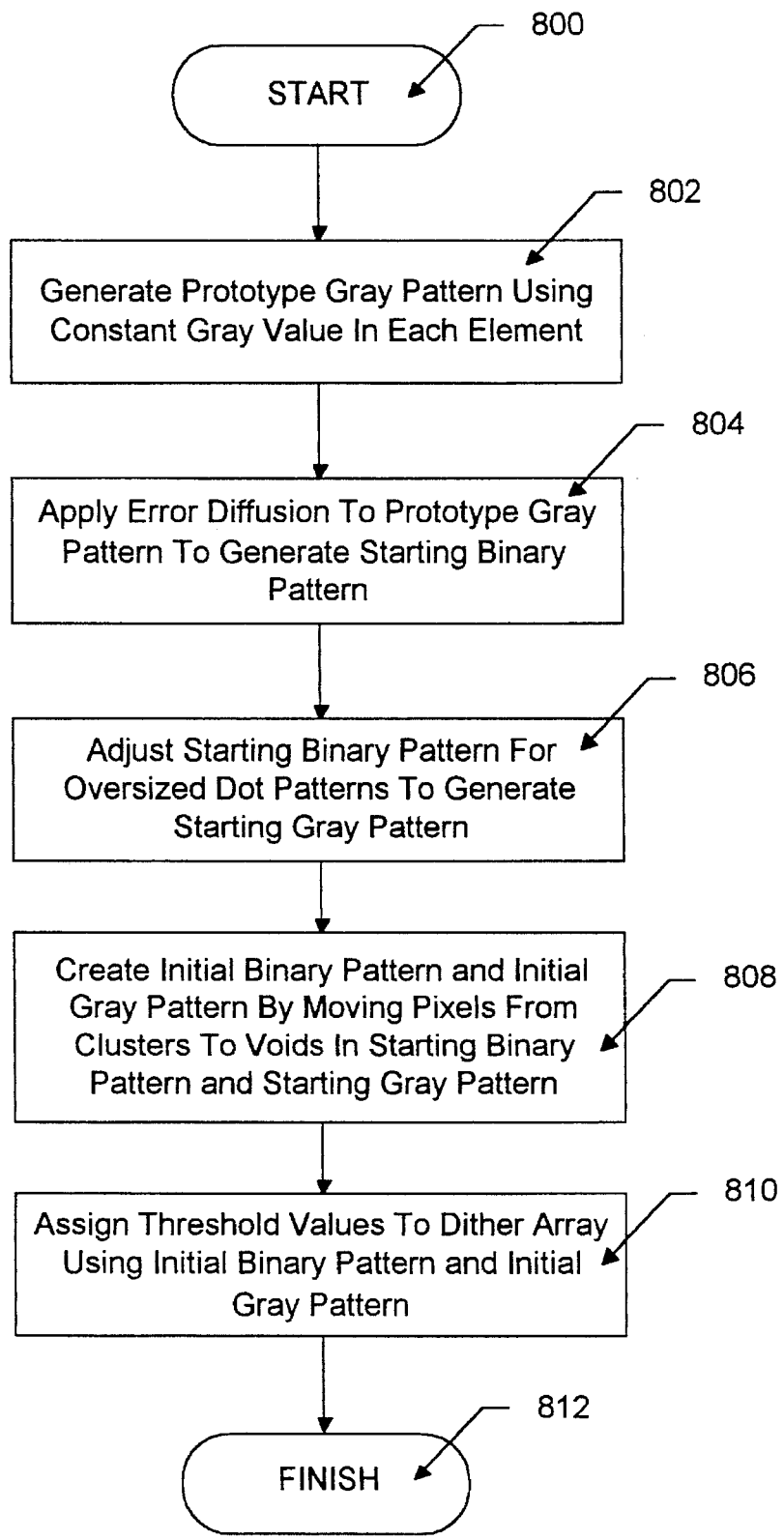
FIG. 8 is an illustrative flowchart of the steps involved in the improved void-and-cluster method.

FIG. 8 is an illustrative flowchart of the inventive void and cluster method incorporating the two improvements discussed above. Although both improvements are applied in the method illustrated in FIG. 8, it should be understood that either improvement step can be applied independent of the other to generate an improved dither array. In particular, the inventive method starts in step 800 and proceeds to step 802 where the Prototype Gray Pattern is generated, illustratively using a constant value in each array element. Next, in step 804, an error diffusion process is applied to the Prototype Gray Pattern to generate the Starting Binary Pattern.

In step 806, the Starting Binary Pattern is adjusted for oversized dot patterns as discussed above and shown in FIG. 7A and 7B to generate the Starting Gray Pattern. Next, in step 808, the Initial Binary Pattern and the Initial Gray Pattern are created from the Starting Binary Pattern and the Starting Gray Pattern, respectively, by moving pixels from clusters to-voids in the manner discussed above in accordance with the prior art void-and-cluster method.

Finally, in step 810, threshold values are assigned to the dither array using the Initial Binary Pattern and the Initial Gray Pattern using the method discussed in detail in connection with FIGS. 9A–9C. The routine then finishes in step 812.

Figure 9A:
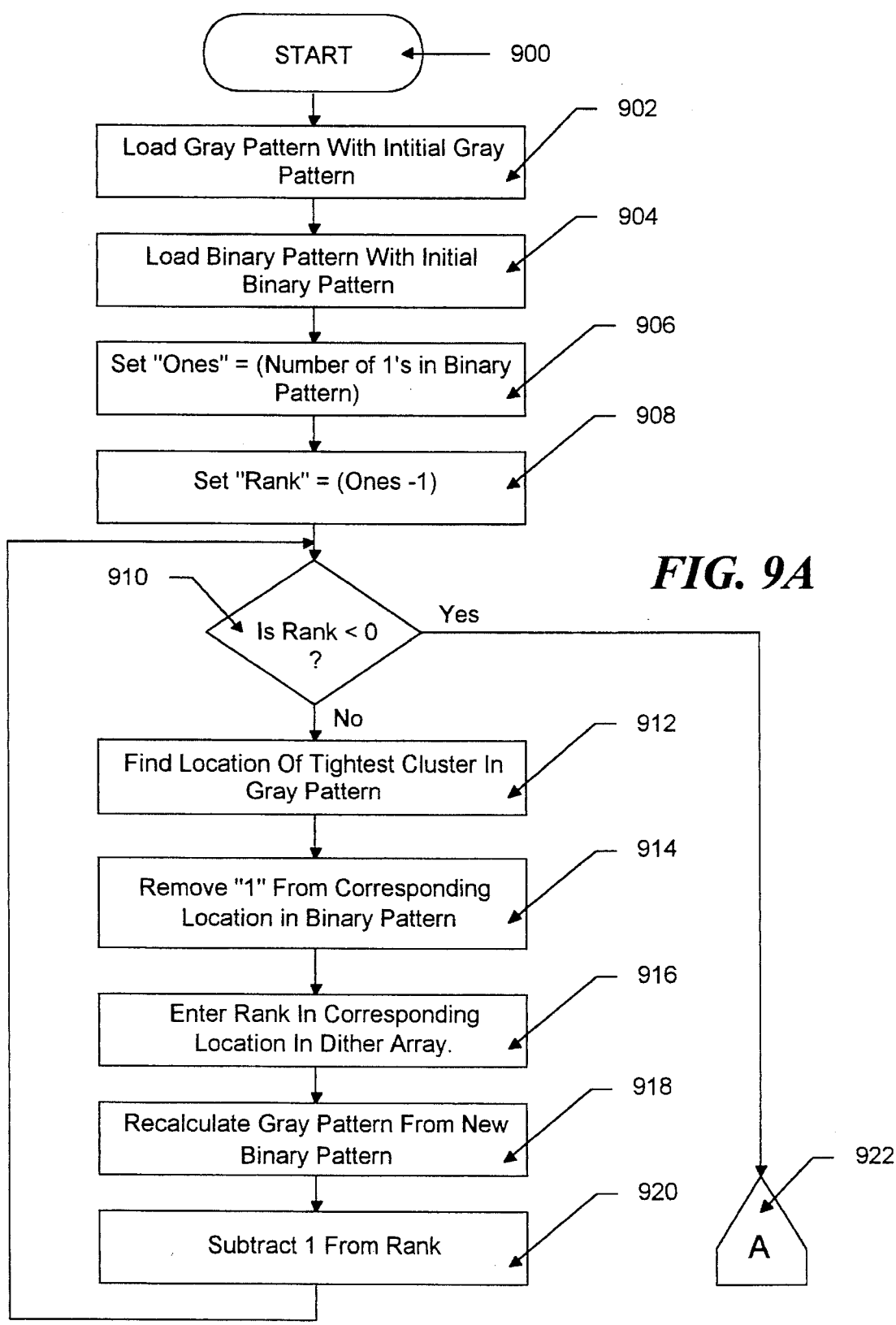
FIGS. 9A–9C, when placed together, form an illustrative flowchart of the steps involved in adding threshold values to the dither array in accordance with the principles of the invention.
Figure 9B:
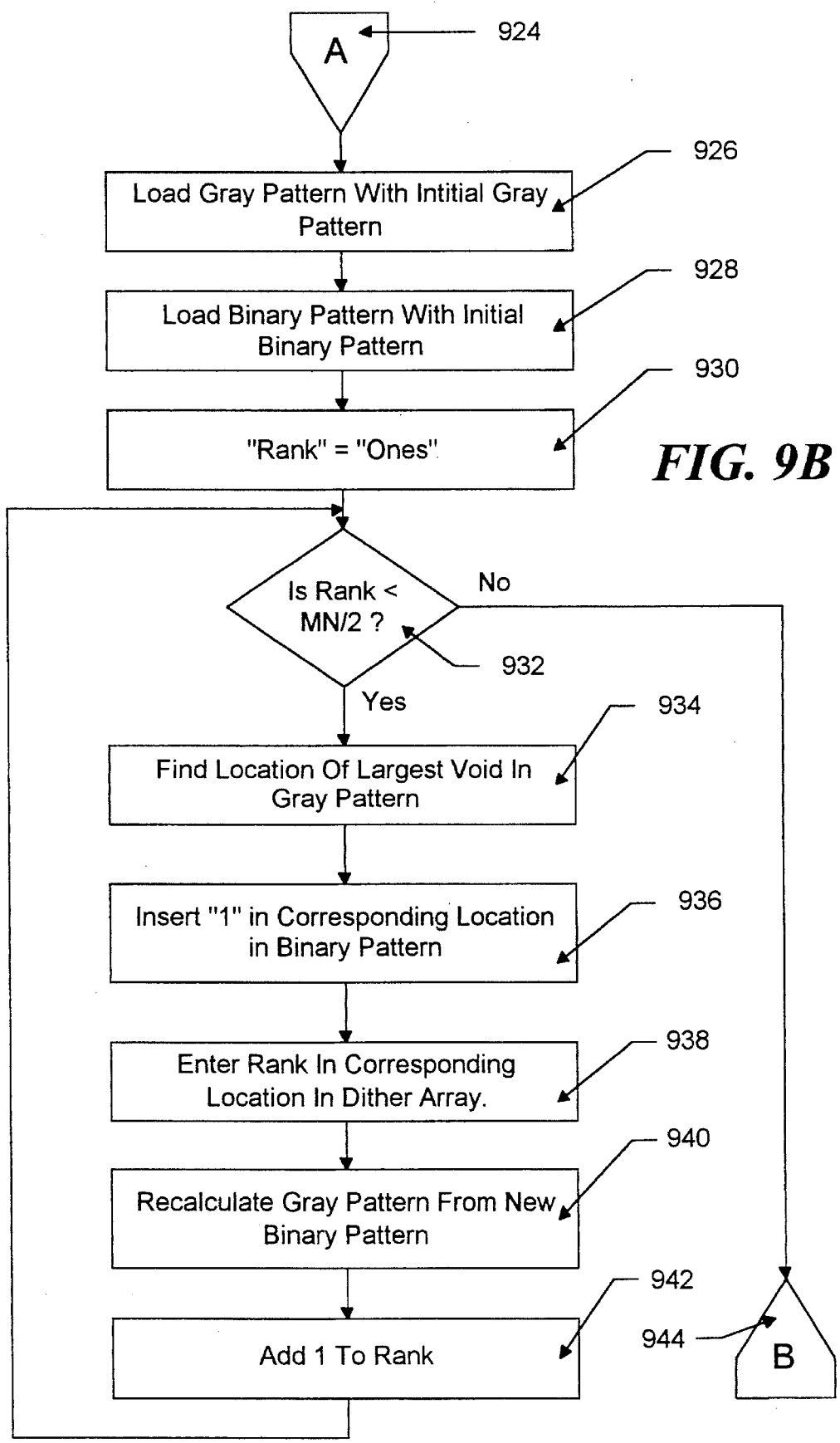
Figure 9C:
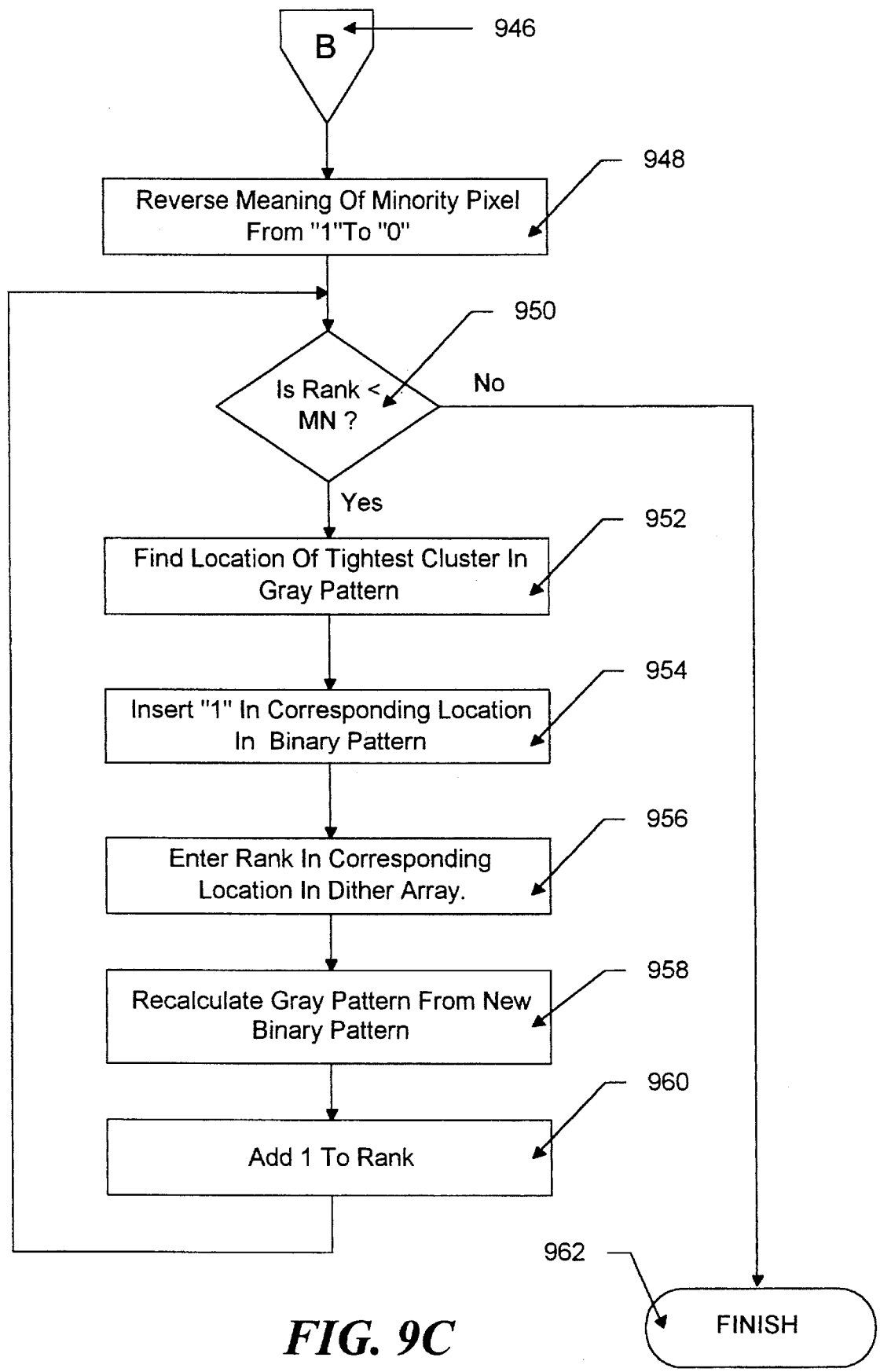

FIGS. 9A, 9B and 9C, when placed together, disclose an illustrative method for assigning threshold values to the dither array utilizing the Initial Gray Pattern and the Initial Binary Pattern. The disclosed method that is similar to that used in the prior art void-and cluster-method, however, the method has been modified to use the Initial Gray ,Pattern to locate the voids and the clusters instead of the Initial Binary Pattern used in the prior art method. Since the Initial Gray Pattern has been adjusted for the effects of oversized dots, it produces a more accurate location for the tightest clusters and largest voids. In particular, the illustrated method has three phases. During Phase I (shown in FIG. 9A) the dither array elements from element numbers ("Ones" −1) to 0 are entered. During Phase II (shown in FIG. 9B), dither array elements from "Ones" to $$\left(\frac{MN}{2} - 1\right)$$

are added and, in Phase III (shown in FIG. 9C) elements $$\left(\frac{MN}{2}\right)$$

to MN are entered.

In particular, the illustrative routine starts in step 900 and proceeds to step 902 where a Gray Pattern Array is loaded with the Initial Gray Pattern. The routine uses two arrays called a "Gray Pattern" array and a "Binary Pattern" array. These arrays have the same number of elements as the dither array (arbitrarily, they are taken to have M rows and N columns). In step 902, the Gray Pattern array is loaded with the values taken from the Initial Gray Pattern array generated as described above.

Next, in step 904, the Binary Pattern array is loaded with the Initial Binary Pattern array values generated as discussed above. Continuing to step 906, a variable "Ones" is set equal to the number of ones in the Binary Pattern, and, in step 908, a variable "Rank" is set equal to the value of the variable "Ones" minus "1".

In step 910, the variable "Rank" is checked to see if it is less than zero. This cheek determines whether Phase I of the threshold assignment routine has been completed. If the value of "Rank" is not less than zero, then the routine proceeds to step 912 in which-the location of the tightest cluster in the Gray Pattern array is determined. As previously mentioned, this determination is made by using a two-dimensional Gaussian filter (described above). This filter takes into account the adjusted gray scale values in the Gray Pattern to locate the tightest cluster.

Then, in step 914, a binary "1" is removed from the Binary Pattern at the location determined in step 912 to form a New Binary Pattern. Subsequently, the value of the "Rank" variable is entered into the corresponding location in the dither array in step 916 to form the new threshold value.

In step 914, the removal of the "1" from the Binary Pattern forces a readjustment of the grayscale values because the $\alpha$, $\beta$ and $\gamma$ values must be readjusted to take into account the fact that the "1" has been removed and a "0" has been inserted in its place. Consequently, in step 918, the Gray Pattern is recalculated from the New Binary Pattern produced by removing the "1" in step 914.

In step 920, the value of the "Rank" variable is decremented and the routine proceeds back to step 910 where a further check is made to determine whether the end of Phase I has been reached. If so, the routine proceeds, via off-page connectors 922 and 924, to Phase II, as shown in FIG. 9B. Alternatively, if, in step 910, the value of the "Rank" variable is not less than zero, then steps 912– 920 are repeated and the routine continues in this matter until Phase I has been completed.

FIG. 9B shows the steps performed in Phase II of the inventive threshold assignment method. In particular, from off-page connector 924, the routines proceeds to step 926 in which the Gray Pattern array is initialized by loading it with the Initial Gray Pattern values determined previously. Similarly, in step 928 the Binary Pattern array is initialized by loading it with the Initial Binary Pattern values determined previously. In step 930 the value of the "Rank" variable is set equal to the value of the "Ones" variable.

Next, in step 932, a check is made to determine whether the value of the "Rank" variable is less than the number of rows times the number of columns divided by two $$\left(\frac{MN}{2}\right).$$

Since the value of the "Rank" variable will increase with each pass through the routine loop, the value of the "Rank" variable will eventually exceed the value $$\left(\frac{MN}{2}\right)$$

and the routine will proceed to Phase III of the threshold assignment method as indicated in step 932.

However, if, in step 932, it is determined that remaining "voids" need to be processed, the routine proceeds to step 934 where the location of the largest void in the Gray Pattern array is determined, again by using the two-dimensional Gaussian filter as described above.

Next in step 936 a binary "1" is inserted into the corresponding location in the Binary Pattern thereby replacing the original "0" to form a New Binary Pattern and, in step 938, the value of the "Rank" variable is entered into the corresponding location of the dither array.

The Gray Pattern array is then recalculated from the New Binary Pattern to adjust for the "0" to "1" replacement in step 936 and the value of the "Rank" variable is incremented by one in step 942. The routine then proceeds back to step 932 in which the value of the "Rank" variable is again checked to determine whether Phase II has been completed. If Phase II has not been completed, steps 934–942 are repeated. At the completion of Phase II as indicated by the value of the "Rank" variable exceeding $$\left(\frac{MN}{2}\right),$$

the routine proceeds, via off-page connectors 944 and 946, to Phase III of the threshold assignment routine as shown in detail in FIG. 9C.

Referring to FIG. 9C, the routine proceeds to from off-page connector 946 to step 948 where the definition of "minority pixels" is changed from "1" to "0" (as previously mentioned, during Phase II the arrays are being filled with binary "1s" and thus binary "1s", which were originally the "minority" pixel, have now become the "majority" pixels). The routine then proceeds to step 950 where the value of the "Rank" variable is checked to see if it is less than the number of rows times the number columns (MN). During Phase III, the value of the "Rank" variable increases and, thus, it will eventually equal MN, at which point the routine will finish.

However, if, in step 950, a determination is made that the value of the "Rank" variable is less than MN, then the routine proceeds to step 952 where the location of the tightest cluster in the Gray Pattern array is determined, again using the previously-described Gaussian filter. Next, in step 954, a "1" is inserted into the Binary Pattern at the location determined in step 952 to form a New Binary Pattern, and, in step 956, the value of the "Rank" variable is entered into the corresponding location in the dither array.

The Gray Pattern array is recalculated from the New Binary Pattern in Step 958 and the value of the "Rank" variable is incremented in step 960. The routine then proceeds back to step 950 to make a determination whether Phase III has been completed. If so, the routine ends in step 962, if not, steps 952 through 960 are repeated until all elements of the dither array have been assigned a threshold value.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. Apparatus for generating an improved dither array for halftone image generation by a printing device, the printing device for outputting a matrix of dots representing an image, each of the dots being oversized with relation to the outputted matrix, the apparatus comprising:

prototype apparatus for generating a prototype gray pattern comprising a two-dimensional array of elements, each element comprising an equal constant value;

error diffusion means, responsive to the prototype gray pattern, for applying an error diffusion halftoning process to the prototype gray pattern to generate a starting binary pattern comprising a two-dimensional array of binary numbers having one of a first value and a second value;

homogenizing apparatus, responsive to the starting binary pattern, for locating clusters of first-value binary numbers and voids between first-value binary numbers and homogenizing the starting binary pattern to generate an initial binary pattern by repetitively moving first-value binary numbers from the clusters to the voids;

oversize adjusting means, responsive to the starting binary pattern, for generating a starting gray pattern in accordance the oversized dots;

initial gray pattern generating means for generating an initial gray pattern in response to the starting gray pattern; and assignment apparatus, responsive to the initial binary pattern and the initial gray pattern, for assigning threshold numbers to generate the improved dither array.

2. Apparatus for generating an improved dither array according to claim 1, wherein said homogenizing apparatus comprises:

a first apparatus responsive to the starting binary pattern for adding correction amounts to each second-value binary number that borders a first-value binary number in order to create the starting gray pattern which corrects for overlap of printing dots used by the printing device; and a second apparatus responsive to the starting gray pattern for locating clusters of first-value binary numbers and voids between first-value binary numbers and homogenizing the starting gray pattern to generate the initial gray pattern by repetitively moving first-value binary numbers from the clusters to the voids.

3. Apparatus for generating an improved dither array according to claim 2, wherein said assignment apparatus is responsive to the initial binary pattern and to the initial gray pattern for sequentially assigning threshold numbers to each of the binary numbers in the initial binary pattern to generate the improved dither array.

4. Apparatus for generating an improved dither array according to claim 2, wherein said assignment apparatus comprises:

a first Gaussian filter responsive to the initial gray pattern for locating a center first-value element in a cluster of first-value binary numbers;

a second Gaussian filter responsive to the initial gray pattern for locating a center second-value element in a void between first-value binary numbers;

a first mechanism for replacing the number in the initial binary pattern at a location corresponding to the center first-value element with a second-value number;

a second mechanism for replacing the number in the initial binary pattern at a location corresponding to the center second-value element with a first-value number to generate a new initial binary pattern; and means for assigning a threshold number in the improved dither array to a location corresponding to the center first-value element.

5. Apparatus for generating an improved dither array according to claim 4, wherein said oversize adjusting means adds correction amounts to each second-value binary number that borders a first-value binary number in order to create the starting gray pattern.

6. Apparatus for generating an improved dither array according to claim 2, wherein the correction amounts comprise:

a first correction amount for correcting for dot overlap and a horizontal and a vertical direction;

a second correction amount for correcting for dot overlap in a diagonal direction; and a third correction amount for correcting for dot overlap caused by overlap of two adjacent dots.

7. Apparatus for generating an improved dither array according to claim 1, wherein said homogenizing apparatus comprises a Gaussian filter responsive to the starting binary pattern for locating clusters of first-value binary numbers and voids between first-value binary numbers.

8. Apparatus for generating an improved dither array according to claim 1, wherein said error diffusion means comprises:

a comparator responsive to the prototype gray pattern for comparing the number in each of the elements in the prototype gray pattern to a predetermined threshold number to generate an output binary value;

error generation apparatus responsive to the output binary value and to the constant value for generating an error value;

filter apparatus responsive to the error value for generating a plurality of error diffusion values; and a mechanism for applying the error diffusion values to the number in selected elements of the prototype gray pattern.

9. A method for generating a dither array for halftone image generation by a printing device, the method comprising the steps of:

A. generating a prototype gray pattern comprising a two-dimensional array of elements, each element comprising a number having a constant value;

B. applying an error diffusion halftoning process to the prototype gray pattern to generate a starting binary pattern comprising a two-dimensional array of binary numbers each having one of a first value and a second value;

C. generating an initial binary pattern in response to the starting binary pattern;

D. adjusting the starting binary pattern to compensate for oversized dots to generate a starting gray pattern;

E. generating an initial gray pattern in response to the starting binary pattern; and F. generating the dither array in accordance with the initial binary pattern and the initial gray pattern.

10. A method for generating a dither array according to claim 9, wherein step D comprises the step of:

D1. adding correction amounts in the starting binary pattern to each second-value binary number that borders a first-value binary number in order to create the starting gray pattern which corrects for overlap of printing dots used by the printing device.

11. A method for generating dither array according to claim 10, wherein step D1 comprises the steps of:

D1a. adding a first correction amount for correcting for dot overlap and a horizontal and a vertical direction;

D2b. adding a second correction amount for correcting for dot overlap in a diagonal direction; and D3c. adding a third correction amount for correcting for dot overlap caused by overlap of two adjacent dots.

12. A method for generating dither array according to claim 9, wherein step B comprises the steps of:

B1. comparing the number in each of the elements in the prototype gray pattern to a predetermined threshold number to generate an output binary value;

B2. error generation apparatus responsive to the output binary value and to the constant value for generating an error value;

B3. generating a plurality of error diffusion values from the error value; and

B4. applying the error diffusion values to the number in selected elements of the prototype gray pattern.

13. A method for generating dither array according to claim 9, wherein steps D and F comprises the initial binary pattern and the initial gray pattern, respectively, using a void and cluster process.

14. A method for generating dither array for halftone image generation by a printing device, the method comprising the steps of:

A. generating a prototype gray pattern comprising a two-dimensional array of elements, each element comprising a number having an equal constant value;

B. applying an error diffusion halftoning process to the prototype gray pattern to generate a starting binary pattern comprising a two-dimensional array of binary numbers having one of a first value and a second value;

C. locating clusters of first-value binary numbers and voids between first-value binary numbers in the starting binary pattern and homogenizing the starting binary pattern to generate an initial binary pattern by repetitively moving first-value binary numbers from the clusters to the voids;

D. adjusting the starting binary pattern to compensate for oversized dots to generate a starting gray pattern;

E. homogenizing the starting gray pattern to generate an initial gray pattern; and F. assigning threshold numbers in response to the initial binary pattern and the initial gray pattern to generate the improved dither array.

15. An apparatus for generating a dither array for halftone image generation by an output device, the output device for outputting a matrix of dots representing an image, each of the dots being oversized with relation to the outputted matrix, the apparatus comprising:

gray pattern generation means for generating a prototype gray pattern matrix comprising m×n elements, wherein m and n are each positive integers, wherein each of the m×n elements comprise equal predetermined values;

error diffusion means for performing error diffusion processing on the gray pattern matrix to form a starting binary pattern comprising m×n elements, each of the m×n elements comprising one of a first value and a second value;

initial binary pattern generating means for generating an initial binary pattern in response to the starting binary pattern;

oversize adjusting means, responsive the starting binary pattern, for generating a starting gray pattern in accordance the oversized dots;

initial gray pattern generating means for generating an initial gray pattern in response to the starting gray pattern; and assigning means for generating the dither array in accordance with the initial binary pattern and the initial gray pattern.

16. The apparatus of claim 15, wherein said initial binary pattern generating means generates the initial binary pattern and the initial gray pattern generating means generates the initial gray pattern using a void and cluster process.

17. The apparatus of claim 15, wherein said oversize adjusting means adds correction amounts to each one of the m×n elements comprising the second value that borders one of the m×n elements that comprises the first value to create the starting gray pattern.

18. The apparatus of claim 17, wherein the correction amounts comprise:

a first correction amount for correcting for dot overlap and a horizontal and a vertical direction;

a second correction amount for correcting for dot overlap in a diagonal direction; and a third correction amount for correcting for dot overlap caused by overlap of two adjacent dots.

19. The apparatus of claim 15, wherein said error diffusion means comprises:

a comparator responsive to the prototype gray pattern matrix for comparing the number in each of the elements in the prototype gray pattern matrix to a predetermined threshold number to generate an output binary value;

error generation apparatus responsive to the output binary value and to the constant value for generating an error value;

filter apparatus responsive to the error value for generating a plurality of error diffusion values; and a mechanism for applying the error diffusion values to the number in selected elements of the prototype gray pattern matrix.

20. An input/output apparatus comprising:

input means for inputting an image:

dither generating means for generating a dither matrix comprising:

gray pattern generation means for generating a prototype gray pattern matrix comprising m×n elements, wherein m and n are each positive integers, wherein each of the m×n elements comprise equal predetermined values, error diffusion means for performing error diffusion processing on the gray pattern matrix to form a starting binary pattern comprising m×n elements, each of the m×n elements comprising one of a first value and a second value, initial binary pattern generating means for generating an initial binary pattern in response to the starting binary pattern, oversize adjusting means, responsive to the starting binary pattern, for generating a starting gray pattern in accordance oversized dots;

initial gray pattern generating means for generating an initial gray pattern in response to the starting gray pattern, and assigning means for generating the dither array in accordance with the initial binary pattern and the initial gray scale pattern;

dither processing means for performing a dither process of the inputted image in accordance with the dither matrix generated by said dither generating means; and output means for outputted with the input image dithered by said dither processing means.

* * * * *